INVENTORS.
HARRY T. AYCOCK, III
ANDREW J. LAVOIE
BY H. H. Loscle
ATT'YS.

Sept. 26, 1967 H. T. AYCOCK III. ET AL 3,344,356
CIRCUIT MEANS TO ADJUSTABLY GATE AND TIME
SHARE TWO MODES OF INTELLIGENCE SIGNALS
Filed Oct. 3, 1963 2 Sheets-Sheet 2

Fig. 2.

INVENTORS.
HARRY T. AYCOCK, III
ANDREW J. LAVOIE
BY
H. H. Losch
ATT'YS.

United States Patent Office 3,344,356
Patented Sept. 26, 1967

3,344,356
CIRCUIT MEANS TO ADJUSTABLY GATE AND TIME SHARE TWO MODES OF INTELLIGENCE SIGNALS
Harry T. Aycock III, Baltimore, and Andrew J. Lavoie, Severna Park, Md., assignors, by mesne assignments, to the United States of America as represented by the Secretary of the Navy
Filed Oct. 3, 1963, Ser. No. 313,710
4 Claims. (Cl. 328—97)

ABSTRACT OF THE DISCLOSURE

A circuit means to adjustably gate and time share two modes of intelligence signals having a triggered gating generator with two outputs of alternate voltage signals coupled through amplifier and clamping circuits to each of two pentodes to control the conduction periods thereof, and two mode video signals coupled through amplifier and clamping circuits respectively to the two pentodes to gate through first one mode video signal followed by the other mode video signal in an adjustable preset time relation through a cathode follower low impedance output.

Background of the invention

This invention relates to time sharing and gating circuits usable in a radar circuit means to reduce interfering echo radar signals and more particularly to a gating circuit which is readily usable in a radar receiver having two modes of operation to gate detected echo signals in one mode of operation providing maximum detection capabilities and in the other mode providing detection in heavy interference or clutter produced by the altitude line.

In all known conventional airborne fire control radars, the presence of a heavy band of interference on the cathode ray tube range indicator at a range proportional to the aircraft height above the terrain is a well-known fact. This band of interference is caused by the 90° side lobes of the antenna striking the ground and returning to be displayed on the radar receiver range indicator at a range proportional to the distance above the ground of the radar carrying aircraft. This interference is commonly referred to as the "altitude return" or the "altitude line." Earlier airborne radars displayed an altitude line of about three miles in width. This interference has always been objectionable but does not make the system unusable. Present systems display an altitude line of about ten miles as a result of improving the target detection capabilities and sensitivity by narrow-band receivers to see targets at long range. The cathode ray tube radar range indicators usually have selective expander circuits therein to display ranges of 25 miles, 50 miles, 100 miles, and 200 miles, and when the 25 mile range is used, approximately 40% of the range display is rendered useless by the altitude line. This greatly degrades the pilot's capability of seeing an enemy target while using the radar in the narrow-band mode of radar operation. One means of reducing clutter in radar receivers is by the use of "back-biasing" usually one or two stages of the intermediate frequency (IF) amplifiers as more fully described in the text, Radiation Laboratory Series, volume 1 (1947) Section 12.8, and also in volume 23 (1948) Section 9.4. Back-bias is used in radar receivers to reduce the effects of countermeasures or when detecting targets in heavy clutter or interference conditions. The back-bias mode of operating a radar does not have long range detection capabilities. The detection capabilities in the back-bias mode are close to half that of the narrow-band mode, or less. However, in the back-bias mode the altitude line is broken up and target detection throughout this band is possible. Where it is necessary to obtain information from both the narrow-band and back-bias modes of operation, the radar may have a means of switching from one mode to the other or separate IF strips may be used in the radar receiver system to display both modes.

Summary of the invention

In the present invention, as an example of use, the narrow-band and back-bias signals from the IF circuits of a radar are automatically gated to greatly reduce the altitude line without reducing long range detection. The gating circuit of this invention gates the back-biased video signals for a predetermined period of time in the initial range sweep and the narrow-band video signals are gated for the remainder of each range sweep. The predetermined period of time for the back-bias video is preferably preset or adjusted to about 198 microseconds which corresponds to 16 nautical miles of electromagnetic wave travel. On the cathode ray tube range display the first 16 nautical miles will appear in the back-bias mode while from 16 nautical miles out to 25, 50, 100, or 200 miles, as selected by the expansion circuits, will appear in the narrow-band mode. While the example of use herein is for gating back-bias and narrow-band detected echo signals to a cathode ray tube display, it should be recognized that other video signals or electric signals may be gated and time shared in a prescribed time sequence in view of the teaching herein. In the present invention a gating generator is triggered by a pulse source which, in the example, is a radar trigger pulse source, to produce signals of predetermined time intervals. These timing signals are used to gate two pentode tubes in alternate conductive states by suppressor grid control. The video signals to be gated are each coupled to the control grid of each pentode and the two pentode anodes are coupled in common as an output of the gated signals for application to a cathode ray tube indicator, or the like. The video signals may then be displayed in the desired sequence, and in the case of the display of video signals from back-biased and narrow-band detected radar echoes, the altitude line interference will be greatly reduced to improve target detection in the first 16 miles of range. It is therefore a general object of this invention to provide a gating circuit to gate video signal information of two intelligence types in alternate and successive predetermined time shared intervals on a common output adaptable for application to a cathode ray tube display.

Brief description of the drawings

These and other objects and the attendant advantages, features, and uses will become more apparent to those skilled in the art as a more detailed description proceeds when considered along with the accompanying drawings, in which:

FIGURE 2 is a schematic circuit diagram of the block circuit shown in FIGURE 1.

Description of the preferred embodiment

Figure 1:
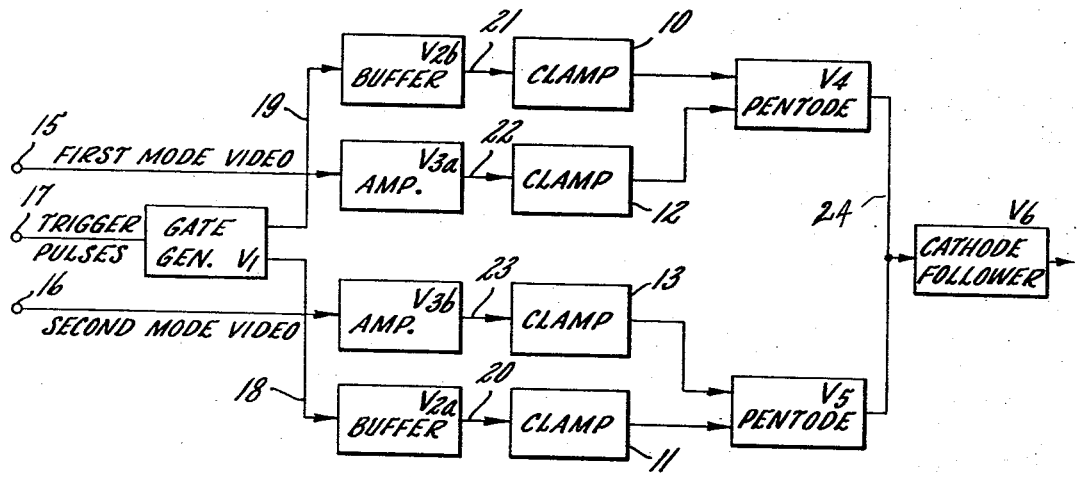
FIGURE 1 is a block circuit diagram of the invention with arrows indicating the flow of information.

Referring more particularly to FIGURE 1, there is illustrated a block circuit diagram of the invention which utilizes information from external sources. One bit of information utilized from an external source may be a first mode video signal which is applied to terminal 15, a second mode video signal which is applied at terminal 16, and trigger pulses which are applied at terminal 17. The trigger pulses trigger a gating generator, indicated herein in block as a V1 tube circuit, which is preferably a monostable multivibrator having two outputs 18 and 19. The outputs 18 and 19 are applied respectively to buffer amplifier tube circuits V2a and V2b which produce signal inversion on their respective outputs 20 and 21. The output 20 is applied to the suppressor grid of a pentode V5 through a clamping circuit 11 while the output 21 of the buffer amplifier is applied to the suppressor grid of a pentode V4 through a clamping circuit 10, as will be more fully disclosed in the description of FIGURE 2, infra. The first and second video mode signals are amplified and inverted by the amplifier circuits V3a and V3b, the outputs 22 and 23 of which are clamped by clamping networks 12 and 13, respectively, these outputs being applied to the control grids of the pentodes V4 and V5, respectively. The anode outputs of the pentodes V4 and V5 are coupled in common on the conductor 24 and this common output applied through a cathode follower output tube circuit V6. The gating generator V1 will produce alternate voltage outputs on 18 and 19 to alternately gate the pentodes V4 and V5 thereby gating the first and second mode video signals in a time shared relation on the output of the cathode follower V6, as will be more fully described in the description of FIGURE 2.

Figure 3:
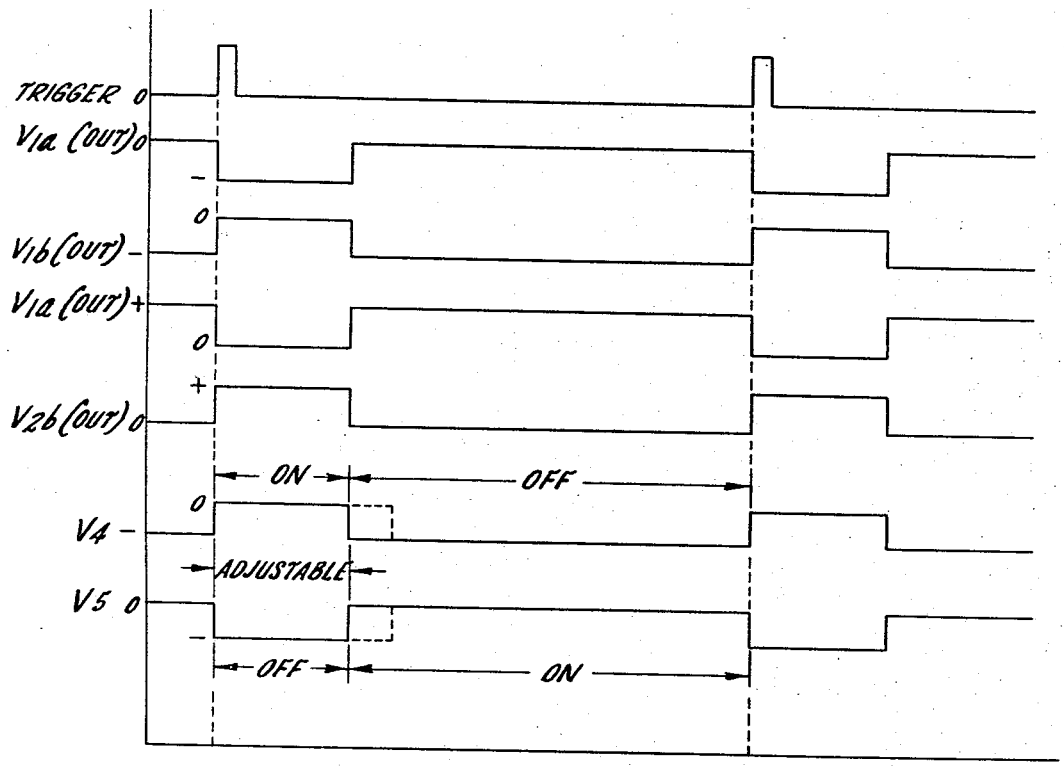
FIGURE 3 illustrates various waveforms produced by the various elements and components in FIGURE 2.

Referring more particularly to FIGURE 2, the trigger pulses applied at terminal 17 are coupled through capacitor 25 to the grid of the triode tube section V1a of a double triode V1 circuited to provide a cathode coupled monostable multivibrator circuit. The grid of triode tube section V1a is coupled to the adjustable tap of a potentiometer 26, the resistive element of which is coupled between a negative voltage source at terminal 27 in series with a resistance 28 to a fixed or ground potential. The potentiometer 26 controls the width or time duration of the pulses to be produced, as will hereinafter be made clear. The cathode of tube section V1a and V1b are coupled in common through a cathode load resistor 29 to the negative voltage source at terminal 27. The anodes of tube V1 are coupled respectively through anode load resistors 30 and 31 to the fixed potential such as ground. Tube section V1a has the output 19 as shown in FIGURE 1 taken from the anode thereof, this anode being capacitor coupled through a capacitor 32 to the grid of tube section V1b, this grid being biased from ground through a resistor 33. The output 18, as shown in FIGURE 1, is taken from the anode of tube section V1b. Any positive trigger pulse applied at 17 will place tube section V1a in conduction which will produce a negative pulse on the output 19, this negative pulse being applied through the capacitor 32 to the grid of tube section V1b to hold this tube section in a nonconductive state. The capacitor 25 and the effective portion of the potentiometer 26 provides a timing network to time the conduction period of tube section V1a in accordance with the adjustment of the width control 26 to thereby control the width of the negative pulse produced on the output 19. When tube section V1a ceases conduction, tube section V1b becomes conductive and will remain conductive by virtue of its bias resistance 33 until the next trigger pulse is applied to terminal 17. The relationship of trigger pulses and the output pulses on conductors 18 and 19 are illustrated in FIGURE 3.

The output conductor 18 from the gate generator tube section V1b is coupled to the grid of a buffer amplifier triode tube section V2a through a capacitor 35. The output conductor 19 of the gate generator tube section V1a is coupled through a capacitor 36 to the grid of a buffer amplifier triode tube section V2b. The grids of V2a and V2b are clamped to zero potential through grid resistors 37 and 38, respectively, being coupled in common to a positive voltage source at terminal 39. The anodes of V2 are coupled to the positive voltage source at 39 through anode load resistors 40 and 41 while the cathodes of this tube are coupled in common to ground. While the tube V2 is shown as a twin triode, it is to be understood that separate triode tubes may be used, where desired. The buffer amplifier V2 will amplify and invert the signals applied thereto on the outputs 21 and 20 coming from the anodes of V2a and V2b, respectively. The buffer amplifiers will conduct heavily until their grids are driven into the cutoff region by the negative pulses from the gate generator $V_1$. By going from clamp to cutoff, very large output pulses are obtained. While the buffer amplifier triode is cut off, a positive pulse appears at its anode. Therefore, inversion of the gate generator pulses occurs on the outputs of these buffers to produce large negative pulses across coupling capacitors.

The output 20 from the buffer amplifier V2b is coupled through capacitor 45 to the suppressor grid of a pentode V4 while the output 21 from the anode of the buffer amplifier V2a is coupled through capacitor 46 to the suppressor grid of the pentode V5. The suppressor grid of pentode V4 is clamped to ground by the direct current (DC) restorer network 10 and the suppressor grid of pentode V5 is clamped to ground by the DC restorer network 11. The DC restorer networks 10 and 11 each have diodes 47 and 48 oriented with the cathodes thereof coupled to ground, each diode being in parallel with resistances 49 and 50, respectively. The cathodes of the pentodes V4 and V5 are coupled to opposite terminals of a resistance element of a potentiometer 51, the center tap of which is coupled to ground potential. The potentiometer 51 is a balance control which allows the grid bias of both pentodes to be adjusted simultaneously until their static characteristics are similar. A balance in the static characteristics prevents a voltage step from occurring at the anodes of the pentodes when the pentodes are gated. The screen grid of pentode V4 is biased from a positive voltage source at 52 through a resistance 53 and the screen grid of pentode V5 is biased from this same positive voltage source through the resistor 54. The anodes of the pentodes V4 and V5 are coupled in common by the conductor 24, these anodes being loaded from a positive voltage source 56 through a resistor 55. Since a negative voltage pulse coming by way of output 19 from the gating generator V1 will be inverted in the buffer amplifier V2b, a positive voltage pulse will be produced on the output 20 of the buffer amplifier V2b which will be clamped to ground by the clamping network 10. This places a zero voltage on the suppressor grid of pentode V4 gating it into a conductive condition, as shown by the waveform V4 in FIGURE 3. At the same time V1b is nonconducting producing a zero potential on the output 18 enabling the buffer amplifier V2a to conduct heavily producing a negative pulse across the capacitor 46 gating pentode V5 to the cutoff state, as shown by the waveform V5 in FIGURE 3. Pentodes V4 and V5 will therefore be gated "on" and "off" alternately, the time duration of the "on" gate of pentode V4 depending on the information adjusted in by the width control potentiometer 26.

The first mode video input signal applied at terminal 15 is coupled by way of capacitor 60 to the grid of a twin triode amplifier tube section V3a while the second mode video input at terminal 16 is applied through the capacitor 61 to the grid of the twin triode tube section V3b. Each grid is biased by resistors 62 and 63 from a fixed or ground potential. The cathodes of V3a and V3b are biased through cathode resistors 64 and 65, respectively, from the ground source. The anodes of the twin triode amplifier V3 are coupled through anode resistors 66 and 67, respectively, to a positive voltage source at terminal 68. The amplified output of the first mode video input from terminal 15 is by way of the conductor means 22 taken from the anode of tube section V3a while the amplified output of the second mode video input signal applied at terminal 16 is conducted on the output conductor 23 from the anode of the tube section V3b. The output conductor 22 is coupled through a capacitor 70 to the clamping network 12 while the output 23 is coupled through capacitor 71 to a clamping network 13. The clamping network 12 includes a diode 72 oriented with the cathode thereof coupled to ground and in parallal with the resistance element of a potentiometer 73. The clamping network 13 includes a diode 74 oriented with the cathode thereof cuopled to ground and in parallel with the resistance element of a potentiometer 75. The movable tap of potentiometer 73 is directly coupled to the control grid of pentode V4 while the movable tap of potentiometer 75 is coupled to the control grid of pentode V5. As the pentodes V4 and V5 are gated to their conductive states the first mode video input or second mode video input will be gated for the common anode outputs 24 on pentodes V4 and V5.

The common anode outputs of the pentodes V4 and V5 on the conductor 24 is capacitor coupled through a capacitor 76 to the grid of a cathode follower tube V6. The anode of cathode follower V6 is coupled through a load resistor 77 to a positive voltage terminal 78 and the cathode is coupled through the resistance element of a potentiometer 79 to the ground source. The adjustable tap of the potentiometer 79 constitutes the output of the circuit which may be taken from the terminal 80. The cathode follower tube V6 is used in order to have a low output impedance which is necessary to drive a coaxial line output or other output circuit taken from terminal 80. The potentiometer 79 is a gain potentiometer which is used to restore the output video amplitude to the same amplitude as the first and second mode video inputs at terminals 15 and 16.

The positive and negative voltages shown applied to terminals 27, 39, 52, 56, 68, and 78 are for a good working example although other voltages may be selected to meet the conditions of tube characteristics of selected tubes.

*Operation*

In the operation of this device let it be assumed that positive trigger pulses of a constant pulse repetition frequency are applied to terminal 17 and that the width control 26 is adjusted to a position to provide an "on" gate for pentode V4 for the first mode video input at terminal 15 for the desired time interval between trigger pulses. This time interval, shown adjustable by the waveform V4 in FIGURE 3, will pass the first mode video input signals applied at terminal 15 over the output 24 of the pentode V4 and as soon as pentode V4 is gated to the nonconductive state pentode V5 will be gated to the conductive state to conduct the second mode video input signals applied at terminal 16 over the anode output 24 of pentode V5. The first and second mode video input signals applied at terminals 15 and 16 are positivee going signals which will be amplified and inverted in the amplifier tube sections V3a and V3b, the positive output voltage swings of which will be clamped to zero by the clamping networks 12 and 13, respectively. This clamping by networks 12 and 13 prevents the grid bias of the pentodes V4 and V5 from shifting with signal strength. The potentiometers 73 and 75 are amplitude gain controls for the pentodes and are used to balance the dynamic characteristics of the pentodes. This is necessary in order to maintain the relative amplitudes of the first and second mode video input signals. The pentodes V4 and V5 are therefore gated by the gating generator V1 to alternately pass the first and second mode video input signals over the cathode follower output to terminals 80 to a point of use.

One particular use to which this circuit may be put is for gating narrow-band video input signals and back-biasing video input signals from a radar, and time-sharing these signals in the radar receiver to reduce the clutter and interference produced by the altitude return or the altitude line where the radar is carried by an aircraft. For the purpose of example, let it be assumed that the trigger pulses applied at terminal 17 are the radar trigger pulses, that the first mode video input signals applied at terminal 15 are the detected back-biased video signals coming from an IF amplifier strip in the radar, and that the second mode video input signals applied at terminal 16 are the detected narrow-band video signals coming from the narrow-band IF strip of the radar receiver. The width or time control potentiometer 26 may be adjusted to control the pentode V4 to gate the back-bias video signals to the output 24 for a predetermined length of time in the cycle between trigger pulses applied at terminal 17 and the remainder of this time being gated by pentode V5 to pass the narrow-band video signals to the cathode follower output of V6. For one good workable example, the width or time control 26 may be adjusted to produce a negative voltage pulse on the output 19 of the gating generator V1a to have a time duration of 198 microseconds. This 198 microseconds time interval, which pentode V4 would be gated "on" to pass back-bias video signals, would amount to 16 nautical miles in travel time for electromagnetic wave energy. Since back-bias is used in radar receivers to break up interference such as that caused by the altitude return or the altitude line on a radar cathode ray tube display, back-bias would be gated in this situation to make it easier to detect targets in the 16 mile range. Using the back-bias mode extending to 16 miles, the altitude line reduction would be effective to 40,000 feet. Should higher or lower altitude effectiveness be desired, a slight adjustment of the width or time control potentiometer 26 can extend or reduce the back-bias mode to longer or shorter ranges. When the back-bias mode is gated "off" by the pentode V4, the narrow-band video will be gated "on" by the pentode V5 and will remain "on" for the remainder of the cycle until the next trigger pulse is applied at 17. The narrow-band video signal passed by the pentode V5 over the cathode follower output to terminal 80 will provide maximum detection capabilities for the radar making it possible to see targets not only in the 16 mile range, which would ordinarily be lost in altitude line interference, but also for maximum detection out to the range capabilities of the radar.

While many modifications and changes may be made in the constructional details and features of this invention to adapt the gating and timing circuit for other examples or uses, it is to be understood that we desire to be limited only by the spirit and scope of our appended claims.

We claim:
1. A time sharing and gating circuit comprising:
   a gating generator having an input coupled to receive trigger pulses of a constant pulse repetition frequency and first and second outputs on which are generated first and second voltage signals alternately in sequence, said input including an adjustable timing network to adjustably time the generation of said first voltage signal after which said second voltage signal is generated in sequence for the remainder of time in the cycle between trigger pulses;
   an amplifier coupled in each of said first and second outputs of said gating generator;
   first and second pentodes each having a suppressor grid, the suppressor grid of said first pentode being coupled in said first gating generator amplified output and the suppressor grid of said second pentode being coupled to said second gating generator amplified output, each pentode having a control grid, the control grid of said first pentode being coupled to an input of first mode intelligence video signals and the control grid of said second pentode being coupled to an input of second mode intelligence signals, and each pentode having an anode output coupled in common;
   a voltage clamping network coupled to each suppressor grid and control grid of each pentode to clamp said first and second voltage signals and said first and second mode intelligence video signals to zero voltage in the positive direction;
   a cathode follower coupled in the common anode out- put of said pentodes to provide a low output impedance; and an amplifier in each input of said first and second mode intelligence video signals whereby said first mode intelligence video signal is gated through said first pentode for a time interval adjusted by said adjustable timing network and out of said cathode follower followed by said second mode intelligence video signal for the remainder of the time in the cycle between trigger pulses thereby adjustably time sharing said first and second mode intelligence video signals in this sequence for all cycles of trigger pulses.

2. A time sharing and gating circuit as set forth in claim 1 wherein said gating generator is a cathode coupled monostable multivibrator and said input is to one control electrode coupled thereto, and said adjustable timing network is a capacitor in series with said input and an adjustable tap of a potentiometer coupled to said input between said capacitor and said one control electrode with the resistance element of said potentiometer being coupled across a voltage source, one terminal of which is coupled to the cathode coupled monostable multivibrator of said gating generator.

3. A time sharing and gating circuit as set forth in claim 2 wherein said clamping networks each include a diode in parallel with a resistance to ground potential, said diode being oriented to conduct positive voltages to said ground potential.

4. A time sharing and gating circuit as set forth in claim 3 wherein said pentodes have cathodes coupled in common through the resistance of a potentiometer, the adjustable tap of which is coupled to ground potential to balance the static characteristics of the pentodes.

References Cited
UNITED STATES PATENTS

| | | | |
|---|---|---|---|
| 2,193,868 | 3/1940 | Geiger | 331—145 |
| 2,403,984 | 7/1946 | Koenig et al. | 328—207 X |
| 2,594,535 | 4/1952 | Bertram | 328—104 |
| 2,778,884 | 1/1957 | Amatniek | 330—69 X |
| 2,927,223 | 3/1960 | Meirowitz | 307—88.5 |
| 3,008,088 | 11/1961 | Beeler | 328—207 X |
| 3,034,065 | 5/1962 | Coleman | 328—154 |
| 3,052,849 | 9/1962 | McCurdy et al. | 328—97 |

OTHER REFERENCES

Strong, J. A.: "Two Forms of Electronic Switch," Journal of Scientific Instruments, vol. 17, 1940, pp. 275–277.

ARTHUR GAUSS, *Primary Examiner.*

R. PLOTKIN, *Assistant Examiner.*